United States Patent
Kimura et al.

(10) Patent No.: US 11,862,206 B2
(45) Date of Patent: Jan. 2, 2024

(54) MAGNETIC RECORDING/REPRODUCING DEVICE AND MAGNETIC RECORDING/REPRODUCING METHOD

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Kaori Kimura, Yokohama Kanagawa (JP); Masaya Ohtake, Fujisawa Kanagawa (JP); Akihiko Takeo, Tokyo (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 17/860,496

(22) Filed: Jul. 8, 2022

(65) Prior Publication Data

US 2023/0169993 A1    Jun. 1, 2023

(30) Foreign Application Priority Data

Nov. 30, 2021    (JP) ................................ 2021-194453

(51) Int. Cl.
  *G11B 5/00*    (2006.01)
  *G11B 5/29*    (2006.01)
  *G11B 5/48*    (2006.01)

(52) U.S. Cl.
  CPC .............. *G11B 5/29* (2013.01); *G11B 5/4866* (2013.01); *G11B 2005/0021* (2013.01); *G11B 2005/0024* (2013.01)

(58) Field of Classification Search
  CPC ......... G11B 5/012; G11B 5/02; G11B 5/1278; G11B 27/36; G11B 20/10009; G11B 20/1258; G11B 5/09; G11B 7/126; G11B 7/1267; G11B 7/0045; G11B 20/1403; G11B 27/24; G11B 7/131; G11B 19/04; G11B 5/00; G11B 20/12; G11B 20/18; G11B 15/02; G11B 19/02; G11B 5/52; G11B 5/54; G11B 15/0005
  (Continued)

(56) References Cited

U.S. PATENT DOCUMENTS 10,014,009 B1    7/2018 Koizumi
10,283,149 B2    5/2019 Lamberts et al.
(Continued)

FOREIGN PATENT DOCUMENTS

JP    2000-123492 A    4/2000
JP    2019-46512 A    3/2019
(Continued)

*Primary Examiner* — Nabil Z Hindi
(74) *Attorney, Agent, or Firm* — Kim & Stewart LLP

(57) ABSTRACT

According to one embodiment, a magnetic recording/reproducing device includes a plurality of magnetic recording medium each including a recording surface, a plurality of assisted magnetic recording heads each provided with the recording surface in order to perform assisted recording, and an assisting amount adjustment part connected to the assisted magnetic recording heads in order to adjust an assisting amount of each assisted magnetic recording head corresponding to a recording capacity of the recording surface.

5 Claims, 10 Drawing Sheets

(58) Field of Classification Search
USPC .................................................... 360/48, 59
See application file for complete search history.

(56) References Cited

U.S. PATENT DOCUMENTS

| | | |
|---|---|---|
| 10,504,543 B1 | 12/2019 | Koizumi |
| 10,867,624 B1 | 12/2020 | Watanabe et al. |
| 11,120,822 B2 * | 9/2021 | Ohtake .................... G11B 5/02 |
| 2013/0335847 A1 * | 12/2013 | Shiroishi ................ G11B 5/607 |
| | | 360/59 |
| 2016/0363972 A1 | 12/2016 | McNally et al. |
| 2017/0097877 A1 | 4/2017 | Dhanda et al. |
| 2018/0004260 A1 | 1/2018 | Amin-Shahidi et al. |
| 2020/0201549 A1 | 6/2020 | Malina et al. |
| 2020/0211585 A1 | 7/2020 | Koizumi et al. |
| 2021/0065744 A1 | 3/2021 | Ito |

FOREIGN PATENT DOCUMENTS

| | | |
|---|---|---|
| JP | 2020-30877 A | 2/2020 |
| JP | 2020-107379 A | 7/2020 |
| JP | 2021-44031 A | 3/2021 |

* cited by examiner

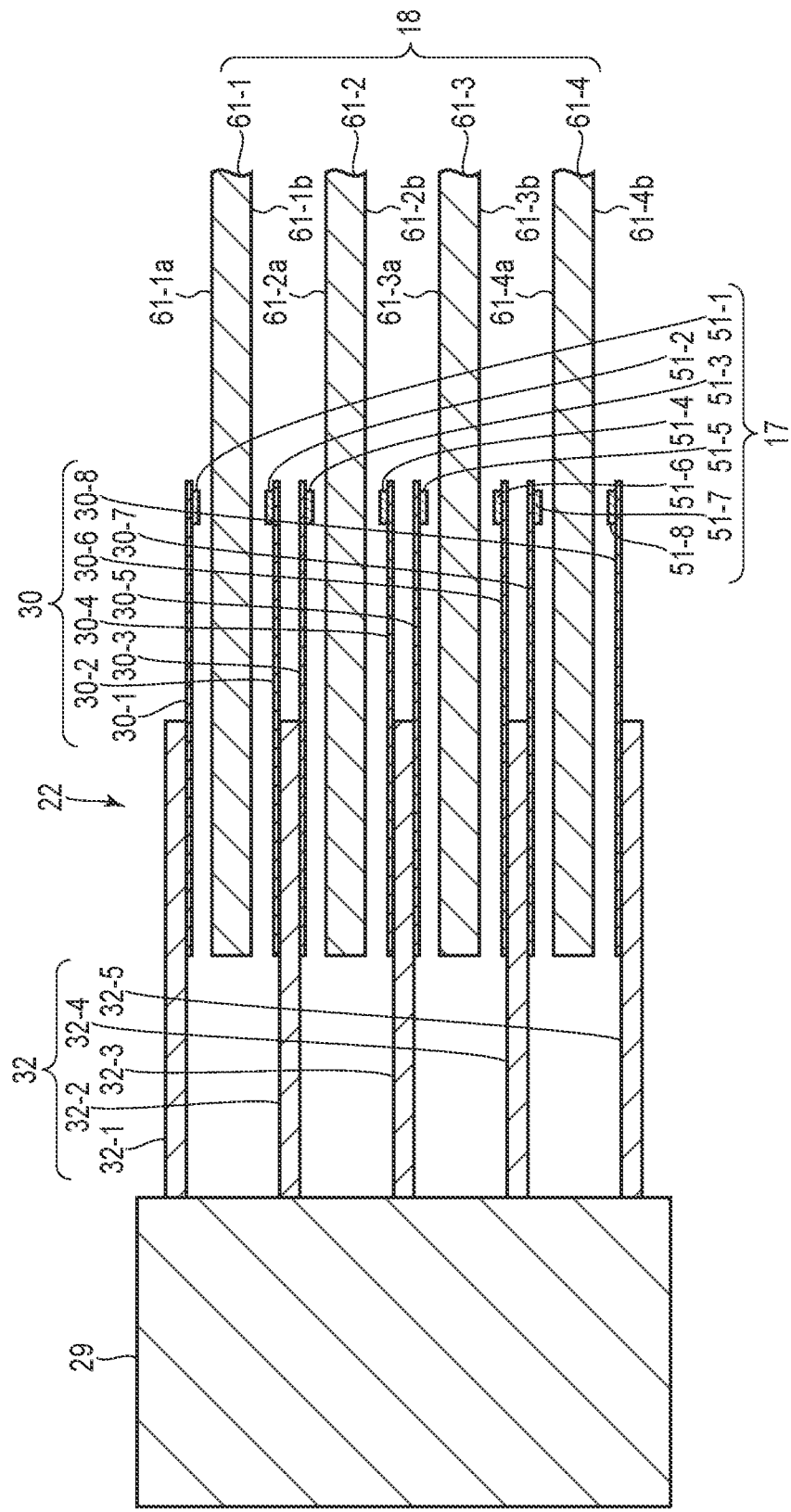
F I G. 2

MAGNETIC RECORDING/REPRODUCING DEVICE AND MAGNETIC RECORDING/REPRODUCING METHOD

CROSS-REFERENCE TO RELATED APPLICATIONS

This application is based upon and claims the benefit of priority from Japanese Patent Application No. 2021-194453, filed Nov. 30, 2021, the entire contents of which are incorporated herein by reference.

FIELD

Embodiments described herein relate generally to a magnetic recording/reproducing device and a magnetic and recording recording/reproducing method.

BACKGROUND

Assisting amount of a magnetic head used for microwave assisted magnetic recording (MAMR) is determined by a bias voltage applied to MAMR elements. As the assist voltage increases, the assisting amount increases, and the recording density increases. However, the continuous heat generated by the current applied to the MAMR element would cause element degradation such as oxidation, electromigration, and melting of the element.

In magnetic recording/reproducing devices which use multiple magnetic recording media, recording capacity of each recording surface of the magnetic recording medium is determined by results of adjustments caused by individual differences in media and heads, and the total write time for each recording surface depends on the recording capacity. When the recording capacity is higher, the write time becomes longer, and thus, the more heat is applied, and in accordance with the Arrhenius' law, the device degradation is more likely to progress.

Such element degradation leads to deterioration of the lifetime of elements (shorter lifetime), deterioration of the lifetime of magnetic heads, and eventually deterioration of the lifetime of the entire magnetic recording/reproducing device. The magnetic recording/reproducing device contains multiple magnetic heads, and if one head deteriorates, the risk of dust generation or the like increases and the lifetime of the device deteriorates as well. Therefore, it is desirable to use each head without degradation as much as possible.

Thus, the lifetime of the assist element of the magnetic head tends to deteriorate on recording surfaces with high recording capacity, and if even one of the multiple magnetic heads deteriorates, the lifetime of the magnetic recording/reproducing device is deteriorated, which is a problem.

BRIEF DESCRIPTION OF THE DRAWINGS

FIG. 2 is a schematic diagram illustrating the structure of recording surface of a plurality of magnetic disks and a plurality of magnetic heads.

DETAILED DESCRIPTION

Figure 1:
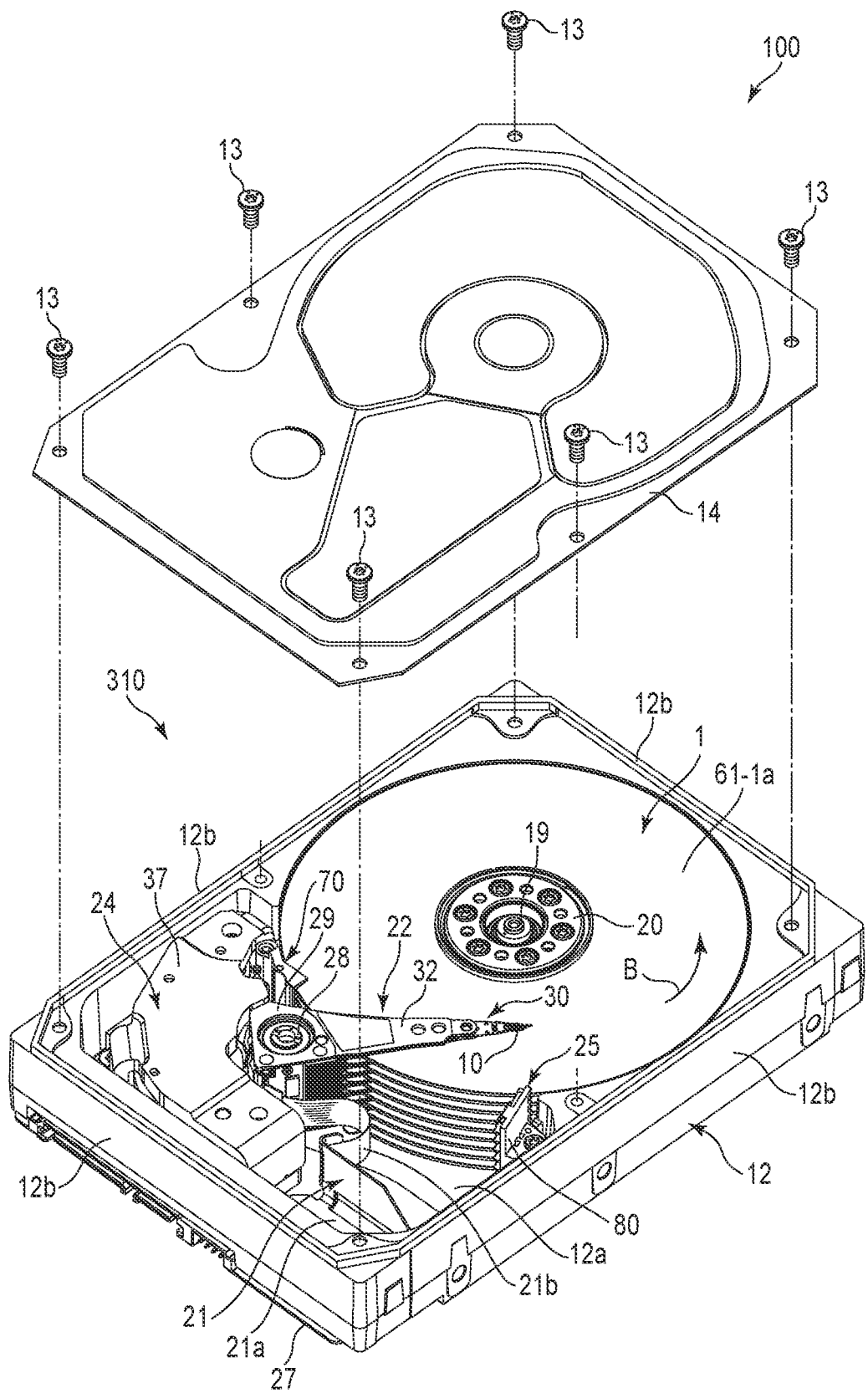
FIG. 1 is a perspective view of HDD of an embodiment, in a disassembled manner.

In general, according to one embodiment, a magnetic recording/reproducing device is an assisted magnetic recording/reproducing device. The assisted magnetic recording/reproducing device includes a plurality of magnetic recording media each including a recording surface, a plurality of assisted magnetic recording heads each provided with the recording surface in order to perform assisted recording, and an assisting amount control part connected to the assisted magnetic recording heads in order to control an assisting amount of each assisted magnetic recording head corresponding to a recording capacity of the recording surface.

Furthermore, according to an embodiment, a magnetic recording/reproducing method uses an assisted magnetic recording/reproducing device with a plurality of magnetic recording media each including a recording surface and a plurality of assisted magnetic recording heads each provided with the recording surface in order to perform assisted recording, and the method includes calculating an initial value of recording capacity of each recording surface from a constant assisting amount, acquiring a ratio of the initial value with respect to a sum of the initial values as a ratio of the recording capacity of each recording surface, and performing adjustment of an assisting amount of the magnetic head based on the ratio of each recording capacity.

The adjustment of the assisting amount can be performed using an assisting amount adjustment part connected to the magnetic head, for example.

Furthermore, the adjustment of the assisting amount includes calculation of a write time ratio, which is a ratio of adjusted write time with respect to total write time corresponding to the recording capacity, from the ratio of the recording capacity, and backward calculation of the assisting amount to be suitable for the write time ratio.

Hereinafter, with reference to the drawings, a disk device as a magnetic recording/reproducing device of an embodiment will be explained.

The disclosure is merely an example and is not limited by contents described in the embodiments described below. Modification which is easily conceivable by a person of ordinary skill in the art comes within the scope of the disclosure as a matter of course. In order to make the description clearer, the sizes, shapes and the like of the respective parts may be changed and illustrated schematically in the drawings as compared with those in an accurate representation. Constituent elements corresponding to each other in a plurality of drawings are denoted by the same reference numerals and their detailed descriptions may be omitted unless necessary.

First Embodiment

As a magnetic recording/reproducing device, a hard disk drive (HDD) of the first embodiment will be described.

FIG. 1 is a perspective view of HDD of the embodiment shown in a disassembled manner in which the cover is removed.

As in FIG. 1, HDD 100 has a rectangular-shaped housing 310. The housing 310 includes a rectangular box-shaped base 12 with an open top surface and a cover (top cover) not shown. The base 12 includes a rectangular bottom wall 12a and side walls 12b erected along the periphery of the bottom wall, and is integrally molded from, for example, aluminum. The cover is formed of stainless steel, for example, in the shape of a rectangular plate, and is screwed onto the side wall 12b of the base 12 such that the upper opening of the base 12 can be hermetically sealed.

As in FIG. 1, in the housing 310, a plurality of magnetic disks arranged to be opposed to each other as magnetic disk 1 as disk-shaped magnetic recording media, and a spindle motor 19 to support and rotate the magnetic disk 1 are disposed. The spindle motor 19 is located on the bottom wall 12a. Each magnetic disk 1 is formed in the shape of a disk of, for example, 95 mm (3.5 inches) in diameter, and includes a substrate formed of a nonmagnetic material, for example, glass and magnetic recording layers formed on the upper (first) and lower (second) surfaces of the substrate. In FIG. 1, for example, 61-1a is the recording surface on the first side. The magnetic disk 1 is fitted to a hub on a common spindle, not shown in the figure, and is further clamped by a clamping spring 20. As a result, the magnetic disk 1 is supported in a position parallel to the bottom wall of the base 12. The magnetic disk 1 is rotated by the spindle motor 19 in the direction of arrow B at a predetermined revolution.

Inside the housing 310, there are a plurality of magnetic heads 10 that record and resume information on the magnetic disk 1, and an actuator assembly 22 that freely supports the magnetic head 10 with respect to the magnetic disk 1. In addition, in the housing 310, there are a voice coil motor (VCM) 24 that rotates and positions the actuator assembly 22, ramp load mechanism 25 that holds the magnetic head 10 in the unloaded position apart from the magnetic disk 1 when the magnetic head 10 moves to the outermost periphery of the magnetic disk 1, substrate unit (FPC unit) 21 on which electronic components such as conversion connectors are mounted, and spoiler 70.

A printed circuit board 27 is screwed to the outer surface of the bottom wall 12a of the base 12. The printed circuit board controls the operation of the spindle motor 19 and, structures the control unit that controls the operation of the VCM 24 and the magnetic head 10 through the board unit 21.

The actuator assembly 22 includes a bearing 28 fixed on the bottom wall 12a of the base 12, a plurality of arms 32 extending from the actuator block, which is not shown, in the bearing 28, suspension assembly (may be referred to as head gimbal assembly: HGA) 30 attached to each arm 32, and magnetic head 10 supported by the suspension assembly 30. The suspension 34 includes its base fixed at the tip of the arm 32 by spot welding or gluing, and extends from the arm 32. The magnetic head 10 is supported at the extending end of each suspension 34. During recording, the suspensions 34 and magnetic heads 10 face each other with magnetic disk 16 therebetween.

FIG. 2 is a schematic view of a part of the structure of the actuator assembly and the magnetic disk of FIG. 1.

In this example, for explanation, the actuator assembly 22 is loaded onto the magnetic disk 1.

As a plurality of magnetic disks 1, magnetic disks 61-1, 61-2, 61-3, and 61-4 are disposed on a common spindle, which is not shown, to be rotatably in this order from the top to the bottom with respect to the bottom wall 12a of base 12, and are spaced at predetermined intervals, parallel to each other and supported to be parallel to the bottom of base 12. The arms 32 are one more in number than the number of magnetic disks. Furthermore, the magnetic heads 10 include twice as many heads as the number of magnetic disks.

In the actuator assembly 22, multiple arms 32-1, 32-2, 32-3, 32-4, and 32-5 extend from one common actuator block 29. The actuator block 29 is disposed rotatably in the bearing 28. One suspension assembly 30-1 is attached to the upper end arm 32-1 and one suspension assembly 30-8 is attached to the lower end arm 32-5. To the arms 32-2, 32-3, 32-4, a pair of suspension assemblies 30-2 and 30-3, pair of suspension assemblies 30-4 and 30-5, and pair of suspension assemblies 30-6 and 30-7 are attached, respectively.

Magnetic heads 51-1, 51-2, 51-3, 51-4, 51-5, 51-6, 51-7, and 51-8 are supported at the tips of suspension assemblies 30-1, 30-2, 30-3, 30-4, 30-5, 30-6, 30-7, and 30-8. Thus, the magnetic heads 51-1, and 51-2 are provided such that they face each other with the magnetic disk 61-1 therebetween. Furthermore, the magnetic heads 51-3 and 51-4 are provided such that they face each other with the magnetic disk 61-2 therebetween. Similarly, the magnetic heads 51-5 and 51-6 are provided such that they face each other with the magnetic disk 61-3 therebetween. In addition, the magnetic heads 51-7 and 51-8 are provided such that they face each other with the magnetic disk 61-4 therebetween. At that time, the magnetic heads 51-2 and 51-3, the magnetic heads 51-4 and 51-5, magnetic heads 51-6 and 51-7 are each back-to-back adjacent to each other.

Thus, in the first embodiment, on both surfaces of a plurality of disks, for example, magnetic disks 61-1, 61-2, 61-3, and 61-4, there provided are recording surfaces 61-1a, 61-1b, 61-2a, 61-2b, 61-3a, 61-3b, 61-4a, and 61-4b. Corresponding to each of recording surfaces 61-1a, 61-1b, 61-2a, 61-2b, 61-3a, 61-3b, 61-4a, and 61-4b, there provided are a plurality of magnetic heads, for example, magnetic heads 51-1, 51-2, 51-3, 51-4, 51-5, 51-6, 51-7, and 51-8.

Figure 3:
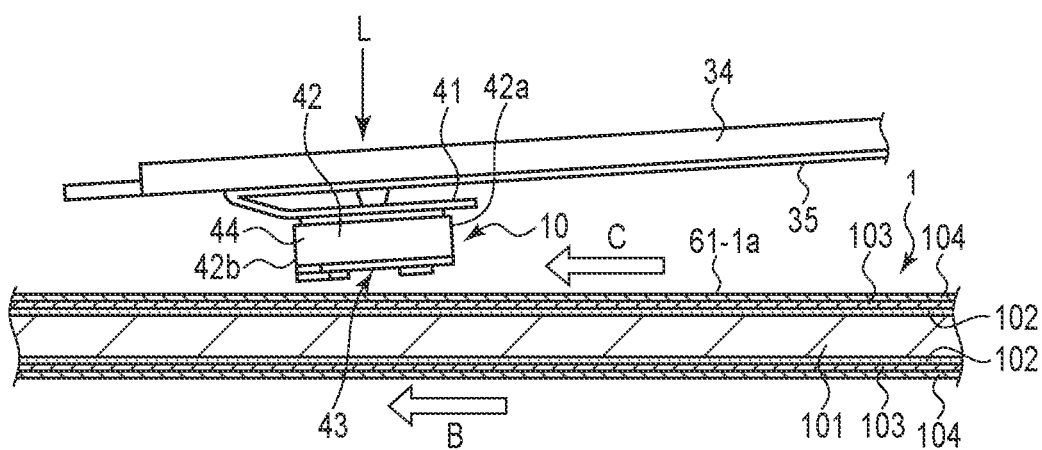
FIG. 3 is a side surface view of magnetic head and suspension in the HDD.

FIG. 3 is a side view of the magnetic head 10 and the suspension.

As in FIG. 3, each magnetic head 10 is configured as a levitating head and includes a nearly rectangular-shaped slider 42 and a head 44 for recording and reproducing is provided at the outflow end (trailing end) of the slider 42. The magnetic head 10 is fixed to a gimbal spring 41 at the tip of the suspension 34. Each magnetic head 10 is subjected to a head load L toward the surface of the magnetic disk 1 due to the elasticity of the suspension 34. As in FIG. 2, each magnetic head 10 is connected to a head amplifier IC 11 and HDC 13 through the suspension 34 and line member (flexure) 35 fixed on the arm 32.

Next, the structure of the magnetic disk 1 and the magnetic head 10 will be described.

Figure 4:
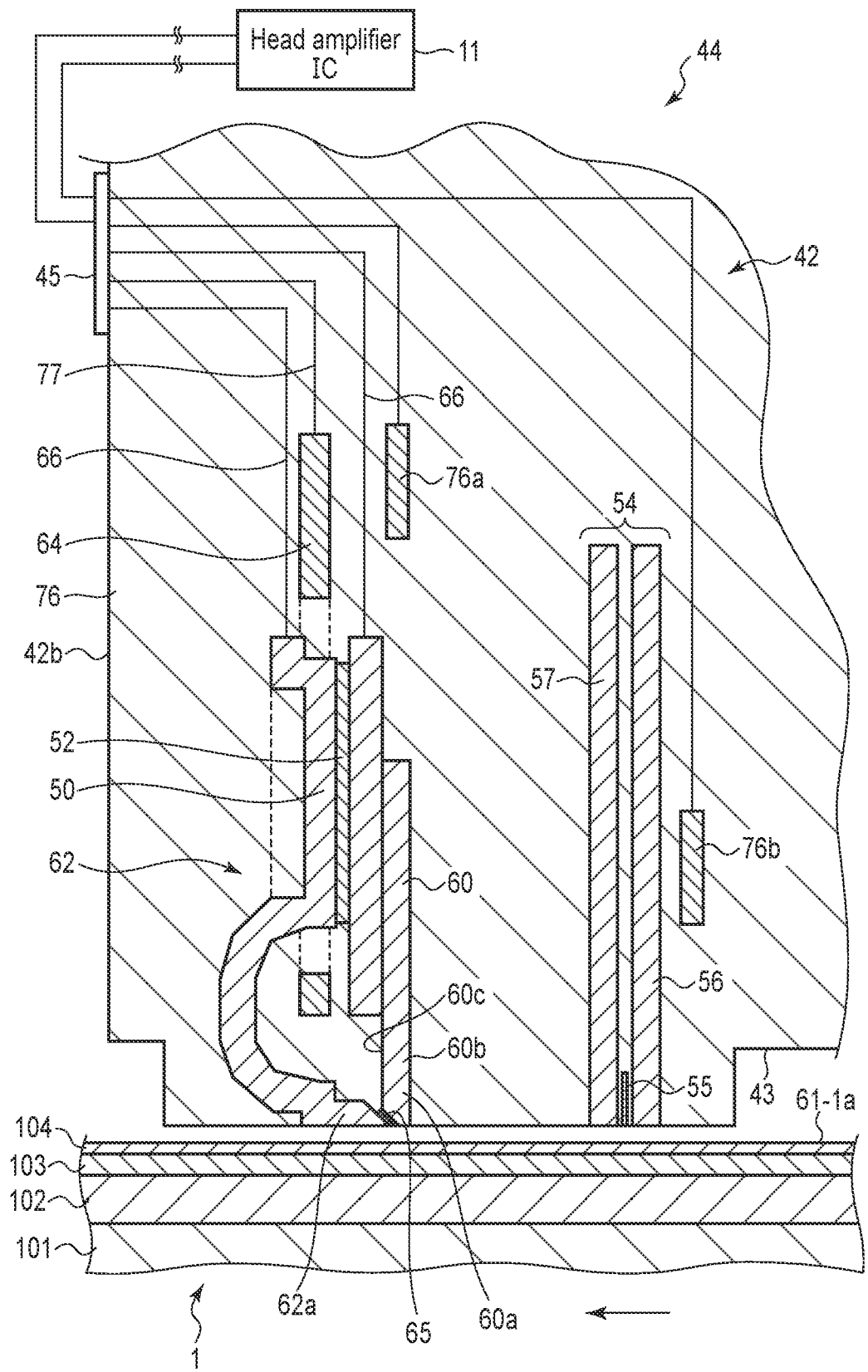
FIG. 4 is a cross-sectional view of a head of the magnetic head of FIG. 3, in an enlarged manner.

FIG. 4 is a cross-sectional view illustrating the head 44 of the magnetic head 10 and the magnetic disk 1 in an enlarged manner.

As in FIGS. 3 and 4, the magnetic disk 1 includes, for example, a disk-shaped substrate 101 of about 2.5 inches (6.35 cm) in diameter, formed of a nonmagnetic material. On each surface of the substrate 101, there is a soft magnetic layer 102 formed of a material exhibiting soft magnetic properties as a base layer, and on the upper layer, there is a magnetic layer 103 with magnetic anisotropy in the perpendicular direction of the disk surface, and on the upper layer, there is a protective layer 104.

The slider 42 of the magnetic head 10 is formed of sintered alumina and titanium carbide (Altic), for example, and the head 44 is formed by layering thin films. The slider 42 includes a rectangular disk-facing surface (air bearing surface (ABS) 43 facing the recording surface 61-1a of the magnetic disk 1. The slider 42 is levitated by air current C produced between the disk surface and the ABS 43 by the rotation of the magnetic disk 1. The direction of the air current C coincides with the direction of rotation B of the magnetic disk 1. The slider 42 is arranged such that the longitudinal direction of ABS 43 approximately coincides with the direction of the air current C with respect to the surface of the magnetic disk 1.

The slider 42 includes a leading end 42a located in the inflow side of air current C and a trailing end 42b located in the outflow side of air current C. In the ABS 43 of the slider 42, a leading step, trailing step, side step, negative pressure cavity, and the like are formed, which are not shown.

As in FIG. 4, the head 44 includes a reproducing head 54 and a recording head (magnetic recording head) 58 formed in a thin-film process at the trailing end 42b of the slider 42, as separated magnetic heads. The reproducing head 54 and the recording head 58 covered by a protective insulating film 76, except for the portion exposed to ABS 43 of the slider 42. The protective insulating film 76 forms the outline of the head 44.

The reproducing head 54 includes a magnetic film 55 that exhibits a magnetoresistive effect, and shield films 56 and 57 arranged to hold the magnetic film 55 in the trailing and reading sides thereof. The lower edges of these magnetic film 55, and shield films 56 and 57 are exposed to the ABS 43 of the slider 42. The recording head 58 is located at the trailing end 42b side of the slider 42 with respect to the reproducing head 54.

Figure 5:
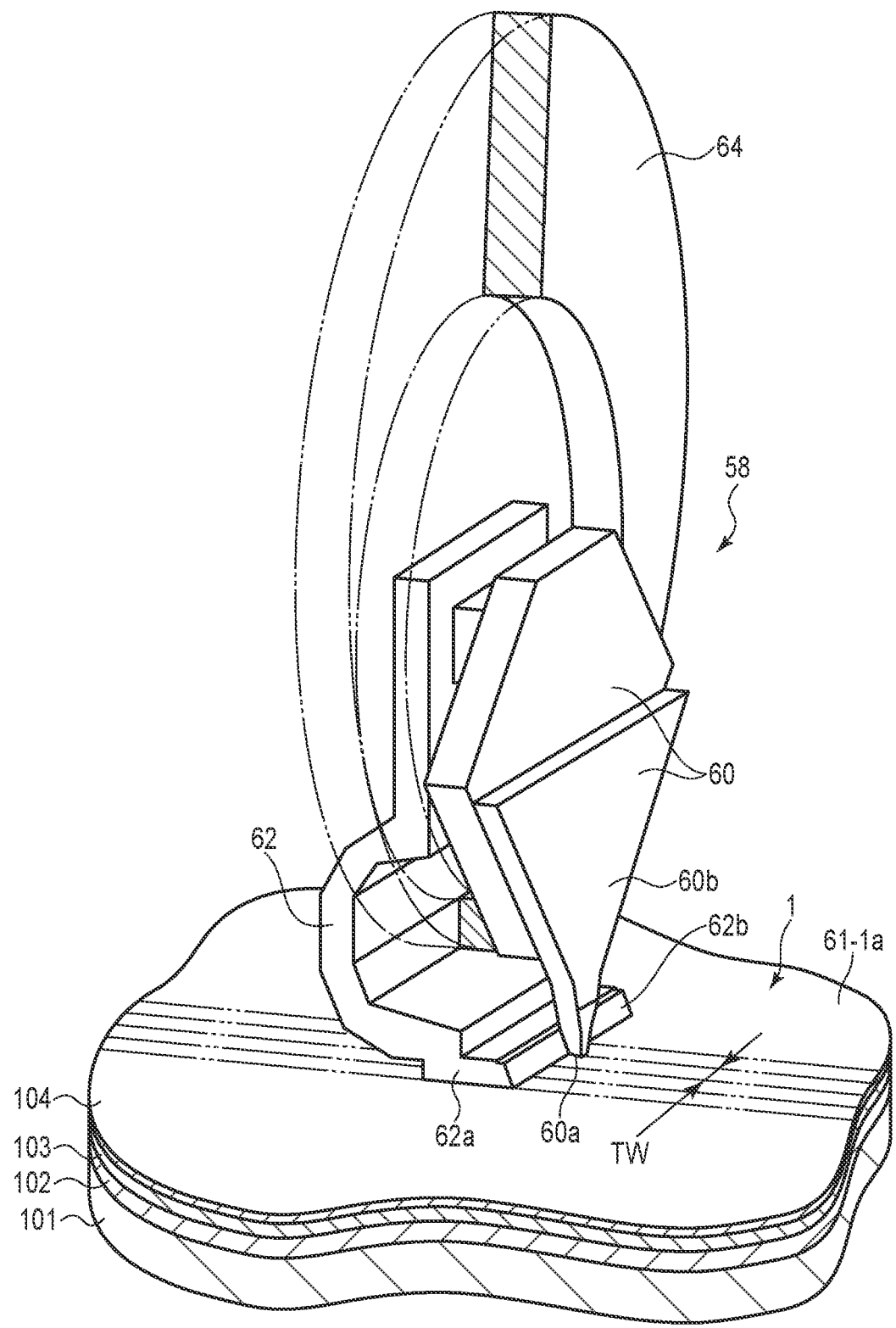
FIG. 5 is a schematic perspective view of a recording head of the magnetic head of FIG. 4.
Figure 6:
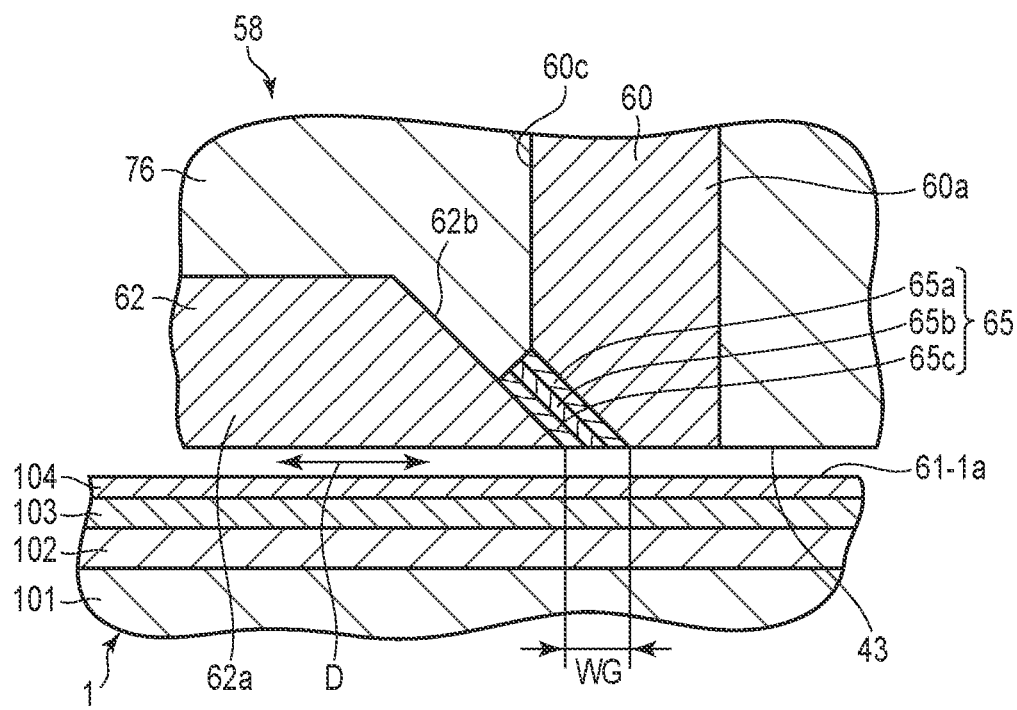
FIG. 6 is a cross-sectional view of an ABS side terminal of the recording head of FIG. 5, taken along a track center.
Figure 7:
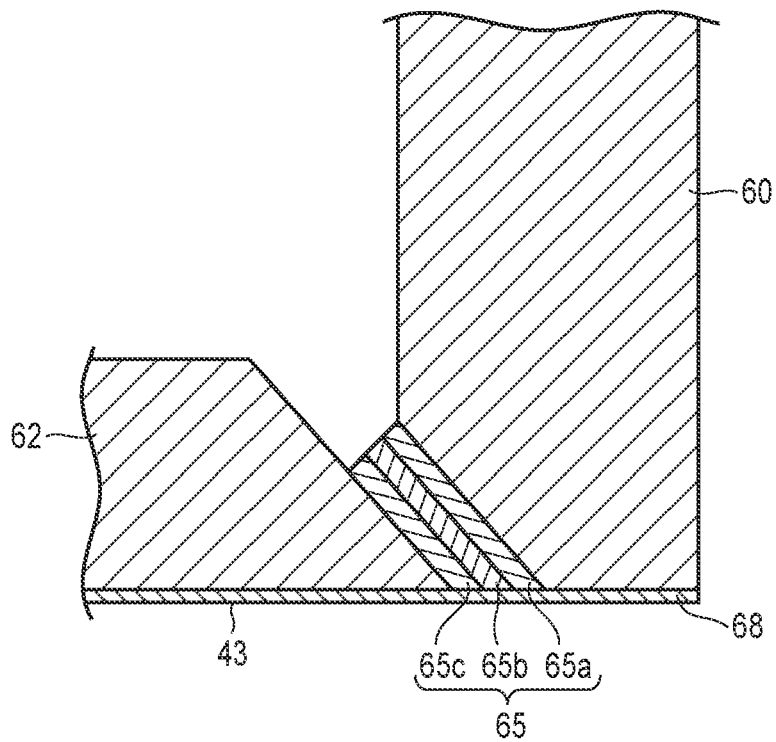
FIG. 7 is a cross-sectional view of the magnetic head of FIG. 6, in a partially enlarged manner.

FIG. 5 is a schematic perspective view of the recording head 58 and the magnetic disk 1, and FIG. 6 is a cross-sectional view illustrating the end part of the magnetic disk 1 side of the recording head 58 in an enlarged manner, taken along the track center. FIG. 7 is a cross-sectional view illustrating the recording head 58 of FIG. 6, in a partially enlarged manner.

As in FIGS. 4 to 6, the recording head 58 includes a main magnetic pole 60 formed of a highly saturated magnetizing material that generates a recording magnetic field perpendicular to the surface of the magnetic disk 1, trailing shield (auxiliary pole) 62 placed in the trailing side of the main magnetic pole 60 and formed of a soft magnetic material provided to effectively close the magnetic path through a soft magnetic layer 102 immediately below the main magnetic pole 60, recording coil 64 arranged to wind around the magnetic core (magnetic circuit) including the main magnetic pole 60 and the trailing shield 62 to flow magnetic flux to the main magnetic pole 60 when writing signals to the magnetic disk 1, and flux control layer 65 arranged between the tip 60a in the ABS 43 side of the main magnetic pole 60 and the trailing shield 62 to be flush with the ABS 43.

The main magnetic pole 60, formed of a soft magnetic material, extends substantially perpendicular to the surface of the magnetic disk 1 and the ABS 43. The lower end of the main magnetic pole 60 in the ABS 43 side includes that a narrowing portion 60b tapers toward ABS 43 and is narrowed in the track width direction in a rote shape, and a tip 60a of a predetermined width extending from the narrowing portion 60b toward the magnetic disk side. The tip, or lower end, of the tip 60a is exposed to the ABS 43 of the magnetic head. The width of the tip 60a in the track width direction substantially corresponds to the track width TW of the recording surface 61-1a of the magnetic disk 1. Furthermore, the main magnetic pole 60 also includes a shield side end surface 60c that extends substantially perpendicular to the ABS 43 and faces the trailing side. In one example, the end in the ABS 43 side of the shield side end surface 60c extends inclining to the shield side (trailing side) with respect to the ABS 43.

The trailing shield 62 formed of a soft magnetic material is approximately L-shaped. The trailing shield 62 includes a tip 62a opposed to the tip 60a of the main magnetic pole 60 with a write gap WG therebetween, and a connection (back gap section) 50 that is apart from the ABS 43 and connected to the main magnetic pole 60. The connection 50 is connected to the upper part of the main magnetic pole 60 via a non-conductor 52, that is, is connected to the upper part which is farther back or upward from the ABS 43.

The tip 62a of the trailing shield 62 is formed in an elongated rectangular shape. The lower end surface of the trailing shield 62 is exposed to the ABS 43 of the slider 42. The leading side end surface (main pole side end surface) 62b of the tip 62a extends along the width direction of the tracks of the magnetic disk 1 and is inclined toward the trailing side with respect to the ABS 43. This leading side end surface 62b is opposed to the shield side end surface 60c of the main magnetic pole 60 in the lower end of the main magnetic pole 60 (part of tip 60a and narrowing portion 60a) in an approximately parallel manner with the write gap WG therebetween.

As in FIG. 6, the flux control layer 65 has a function to suppress only the inflow of magnetic flux from the main magnetic pole 60 to the trailing shield 62, that is, to oscillate the spin torque such that the permeability of the effective write gap WG becomes negative.

In detail, the magnetic flux control layer 65 includes a conductive intermediate layer (first nonmagnetic conductive layer) 65a, adjustment layer 65b, and conductive cap layer (second nonmagnetic conductive layer) 65c, which is conductive, and the aforementioned layers are layered from the main magnetic pole 60 side to the trailing shield 62 side, that is, the layers are layered sequentially along the running direction D of the magnetic head. The intermediate layer 65a, adjustment layer 65b, conduction cap layer 65c each have a film surface parallel to the shield side end surface 60c of the main magnetic pole 60, that is, film surface extending in the direction that intersects the ABS 43.

Note that, the intermediate layer 65a, adjustment layer 65b, and conduction cap layer 65 are not limited to the above example, and may be layered in the opposite direction, that is, from the trailing shield 62 side to the main magnetic pole 60 side.

Furthermore, as in FIG. 7, a protection layer 68 is disposed on the ABS 43 of the recording head 58 including the main magnetic pole 60, flux control layer 65, and trailing shield 62.

The intermediate layer 65a can be formed of a metal layer of, for example, Cu, Au, Ag, Al, Ir, NiAl alloys that do not interfere with spin conduction. The intermediate layer 65a is formed directly on the shield side end surface 60c of the main magnetic pole 60. The adjustment layer 65b includes a magnetic material including at least one of iron, cobalt, or nickel. As the adjustment layer, for example, an alloy material of FeCo with at least one additive of Al, Ge, Si, Ga, B, C, Se, Sn, and Ni, and at least one type of material selected from an artificial lattice group of Fe/Co, Fe/Ni, and Co/Ni can be used. The thickness of the adjustment layer may be, for example, 2 to 20 nm. The conduction cap layer 65c can be a nonmagnetic metal and a material that blocks spin conduction. The conduction cap layer 65c can be formed of, for example, at least one selected from a group of Ta, Ru, Pt, W, Mo, and Ir, or an alloy containing at least one thereof. The conduction cap layer 65c is formed directly on the leading end surface 62b of the trailing shield 62. Furthermore, the conduction cap layer can be single or multi-layered.

The intermediate layer 65a is formed to be thick enough to transfer spin torque from the main magnetic pole 60 while sufficiently weakening the exchange interaction, for example, 1 to 5 nm. The conduction cap layer 65c is formed to be thick enough to block the spin torque from the trailing shield 62 while still allowing the exchange interaction to be sufficiently weak, for example, 1 nm or greater.

Because the orientation of the magnetization of the adjustment layer 65b requires to be opposite to the magnetic field by the the spin torque from the main magnetic pole 60, the saturation magnetic flux density of the adjustment layer 65b should be small. On the other hand, in order to effectively shield the magnetic flux by the adjustment layer 65b, the saturation flux density of the adjustment layer 65b should be large. The magnetic field between the write gap WG is approximately 10 to 15 kOe, and thus, even if the saturation magnetic flux density of the adjustment layer 65b is 1.5 T or higher, the improvement effect is unlikely to be enhanced. Therefore, the saturation magnetic flux density of the adjustment layer 65b should be 1.5 T or less, and more specifically, the adjustment layer 65b is, preferably, formed such that the product of the film thickness of 65b and the saturation magnetic flux density becomes 20 nmT or less.

In order to focus the current flow in the direction perpendicular to the film surfaces of the intermediate layer 65a, adjustment layer 65b, and conduction cap layer 65c, the flux control layer 65 is surrounded by an insulating layer, for example, protective insulating film 76, except for the part in contact with the main magnetic pole 60 and the trailing shield 62.

The main magnetic pole 60 can be formed of a soft magnetic metal alloy with Fe—Co alloy as its main component. The main magnetic pole 60 also functions as an electrode for applying electric current to the intermediate layer 65a. The trailing shield 62 can be formed of a soft magnetic metal alloy with a Fe—Co alloy as its main component. The trailing shield 62 also serves as an electrode for applying current to the conduction cap layer 65c.

The protective layer 68 is disposed to protect the ABS 43, and formed of one or more materials, and can be a single layer or multiple layers. The protective layer has a surface layer formed of, for example, diamond-like carbon.

Furthermore, a base layer formed of Si or the like can be disposed between the ABS 43 of the recording head 58 and the protective layer 68.

An additional base layer may be provided between the main magnetic pole 60 and the intermediate layer 65a.

For example, a metal such as Ta or Ru can be used as the base layer. The thickness of the base layer can be 0.5 to 10 nm, for example. Furthermore, it can be about 2 nm.

Furthermore, an additional cap layer may be provided between the trailing shield 62 and the conduction cap layer 65c.

As the cap layer, at least one non-magnetic element selected from a group consisting of Cu, Ru, W, and Ta can be used. The thickness of the cap layer can be 0.5 to 10 nm, for example. Furthermore, it can be about 2 nm.

In addition, CoFe can be used as a spin-polarized layer between the main magnetic pole and the intermediate layer.

As in FIG. 4, the main magnetic pole 60 and trailing shield 62 are each connected via line 66 to the connection terminal 45, and further connected to the head amplifier and HDC, which are not shown, via line member (flexure) 35 in FIG. 2. A current circuit to apply an STO drive current (bias voltage) in series from the head amplifier IC through the main magnetic pole 60, STO 65, and trailing shield 62 is structured.

The recording coil 64 is connected to the connection terminal 45 via line 77, and is further connected to the head amplifier IC via the flexure 35. When writing signals to a magnetic disk 12, recording current is applied to the recording coil 64 from the recording current supply circuit of the head amplifier IC, which is not shown, and thus, the 60 main magnetic poles is excited, causing a magnetic flux to flow through the main magnetic pole 60. The recording current supplied to the recording coil 64 is controlled by the HDC.

According to the HDD configured as described above, driving the VCM 4 causes the actuator 3 to be driven to rotate, and the magnetic head 10 is moved to a desired track of the recording surface 61-1a of the magnetic disk 1 to be positioned. As in FIG. 3, the magnetic head 10 is levitated by the air current C produced between the disk surface and the ABS 43 by the rotation of the magnetic disk 1. During HDD operation, the ABS 43 of the slider 42 is facing the disk surface with a gap therebetween. In this state, read of recorded information is performed with respect to the magnetic disk 1 by the reproducing head 54 while write of information is performed by the recording head 58.

The head 44 of the magnetic head is equipped with a first heater 76a and a second heater 76b optionally. The first heater 76a is located near the recording head 58, for example, near the recording coil 64 and the main magnetic pole 60. The second heater 76b is located near the read head 54. The first heater 76a and the second heater 76b are each connected to the connection terminal 45 via lines, and further connected to the head amplifier IC 11 via the flexure 35.

The first and second heaters 76a and 76b are coiled, for example, and by being energized, generate heat and cause thermal expansion of the surrounding area. Thereby the ABS 43 near the recording head 58 and reproducing head 54 protrudes, bringing it closer to the magnetic disk 1 and lowering the levitation height of the magnetic head. By controlling the heat generation as above through adjusting the drive voltages supplied to the first and second heaters 76a and 76b, the levitation height of the magnetic head can be controlled.

Figure 8:
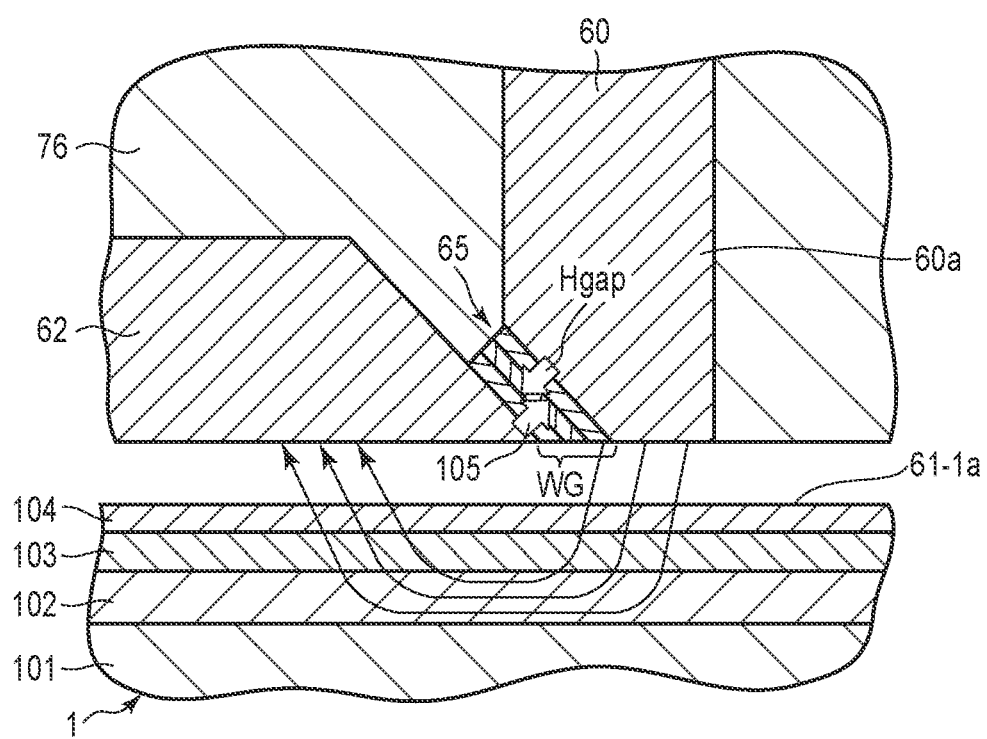
FIG. 8 is a schematic view of a generated magnetic field of the recording head of FIG. 7.

FIG. 8 schematically illustrates a magnetization state in the write gap WG with the flux control layer 65 functioning.

In the above writing of information, as in FIGS. 4 and 8, alternating current is applied from the power supply to the recording coil 64, and thus, the recording coil 64 excites the main magnetic pole 60, and a perpendicular recording magnetic field is applied from the main magnetic pole 60 to the recording layer 103 of the magnetic disk 1 immediately below thereof. Thus, information is recorded in the magnetic recording layer 103 at the desired track width.

Furthermore, when applying a recording magnetic field to the magnetic disk 1, the current is applied from another power supply through the line 66, main magnetic pole 60, flux control layer 65, and trailing shield 62. This current application causes spin torque from the main magnetic pole 60 to act on the adjustment layer 65b of the magnetic flux control layer 65, and the direction of magnetization of the adjustment layer 65b is as shown by arrow 105, directed to be opposite to the direction of the magnetic field (gap magnetic field) Hgap generated between the main magnetic pole 60 and the trailing shield 62. Such magnetization reversal causes the adjustment layer 65b to block the magnetic flux (gap magnetic field Hgap) flowing directly from the main magnetic pole 60 to the trailing shield 62. As a result, the magnetic field leaking from the main magnetic pole 60 into the write gap WG is reduced, and the degree of convergence of the magnetic flux from the tip 60a of the main magnetic pole 60 to the magnetic recording layer 103 of the magnetic disk 1 improves. This improves the resolution of the recording magnetic field and increases the recording line density. Note that the above is a mode in which the magnetization of the magnetic flux control layer reverses due to the effect of spin torque, but it also includes a mode in which the magnetization of the magnetic flux control layer rotates simultaneously. By applying the high-frequency magnetic field generated by the simultaneous rotation to the magnetic recording layer 103, the recording line density can be increased.

Figure 9:
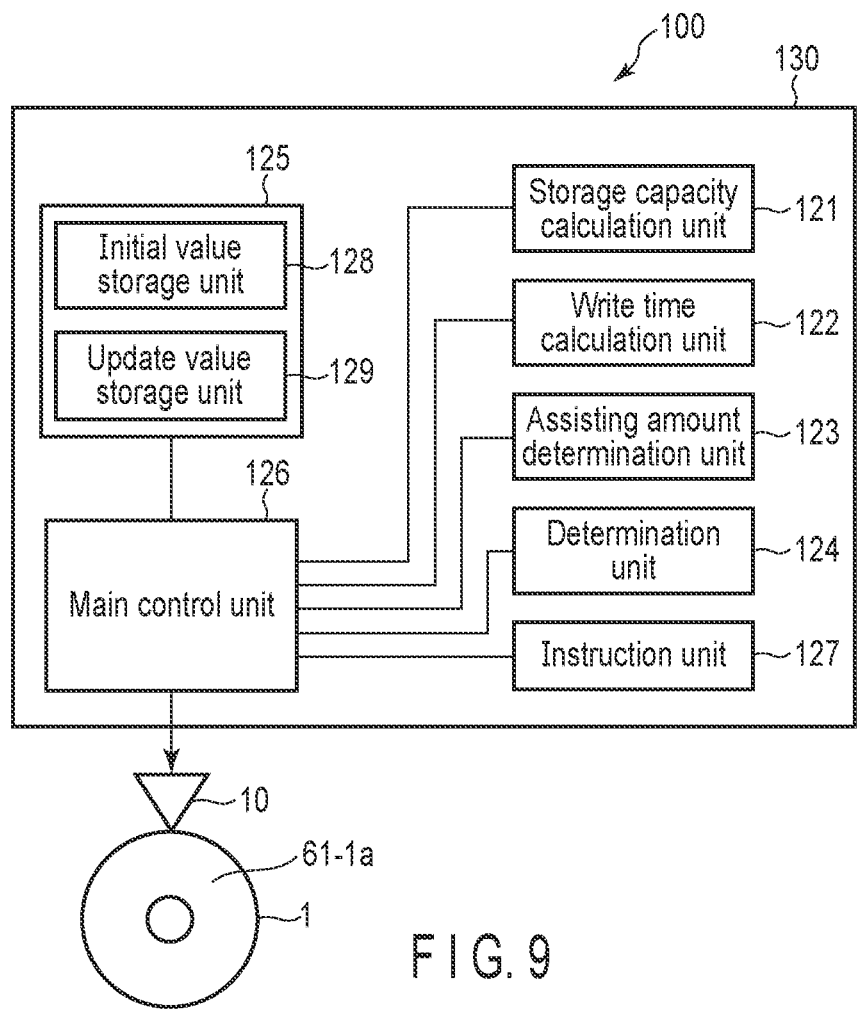
FIG. 9 is a block diagram illustrating a part of the functional structure of a magnetic recording/reproducing device of the embodiment.

FIG. 9 is a block diagram illustrating part of the functional structure of the magnetic recording/reproducing device of the embodiment.

As in the figure, the magnetic recording/reproducing device 100 of the embodiment is an assisted magnetic recording/reproducing device including a plurality of magnetic recording medium 1 such as a magnetic recording medium having a recording surface 61-1a, a plurality of assisted magnetic recording heads 10 disposed to correspond to each recording surface such as recording surface 61-1a, and an assisting amount adjustment part 130 connected to the assisted recording magnetic heads 10. The assisting amount adjustment part 130 adjusts the assisting amount of each assisted magnetic head 10 corresponding to the recording capacity of each recording surface. Note that, there are a plurality of magnetic recording medium 1 and assisted magnetic recording heads 10 while one magnetic recording medium 1 and one assisted magnetic recording head 10 are described for simplification.

The assisting amount adjustment part 130 is, for example, connected to the assisted magnetic recording head 10 to perform the magnetic recording to the magnetic disk 1, and may include a main control unit 126 which controls a change of the assisting amount of the magnetic head 10, recording capacity calculator 121 which is connected to the main control unit 126 to calculate an initial value of the recording capacity of each recording surface such as recording surface 61-1a, a sum of the initial values of the recording capacity of each recording surface, and a ratio of initial values of the recording capacity of each recording surface with respect to the sum (ratio of recording capacity), write time calculator 122 which calculates the ratio of adjusted write time (write time ratio) with respect to a write time (total write time) corresponding to the recording capacity from the ratio of the recording capacity, assisting amount determination unit 123 which determines the assisting amount corresponding to the write time ratio by backward calculation, determination unit 124 which determines update of the assisting amount setting value upon receiving the information from the assisting amount determination unit 123, and instruction section 127 which instructs updating of the assisting amount setting value based on the determined assisting amount.

To the main control unit 126, an initial value storage unit 128 which stores the initial values of recording capacity of each recording surface and a memory unit 129 which contains an updated value memory unit 129 that stores the assisting amount determined in proportion to the write time ratio can be connected. By providing the memory unit 125, for example, the recording capacity calculator 121 can calculate the total value of the initial values from the initial value of the recording capacity acquired from the initial value memory unit 128 and the ratio of the recording capacity. In the updated value storage unit 129 can store the updated value of the assisting amount set in proportion to the write time ratio.

Based on the updated assisting amount, the application of current to the assisted recording element is adjusted for each recording surface to adjust the assisting amount, and assisted magnetic recording can be performed. For such assisted magnetic recording, for example, between the assisting amount adjustment part 130 and the magnetic head 10, optionally, for example, a calculation unit (which is not shown) to calculate a change amount of current to be applied to the assisted recording element, for example, the magnetic flux control layer 65 of FIG. 8 from a change amount between the updated value of the assisting amount acquired from the update value storage unit 129 and a constant assisting amount used to acquire the initial value, determination unit (not shown) that determines the current to be applied according to the amount of change in the current, and instruction unit (not shown) that instructs the magnetic head 10 to apply current to the assisted recording element upon receiving the determined current information can be connected.

Furthermore, if need be, the recording capacity calculation unit 121, write time calculation unit 122, and assisting amount determination unit 123, initial value storage unit 128, and update value storage unit 129, etc., can be installed in an external device such as PC connectable or communicable to the assisting amount adjustment part 130 instead of installed in the assisting amount adjustment part 130.

As assisted recording methods, microwave assisted magnetic recording (MAMR) method, heat assisted magnetic recording (HAMR) method, and energy assisted perpendicular magnetic recording (ePMR) method can be cited.

Figure 10:
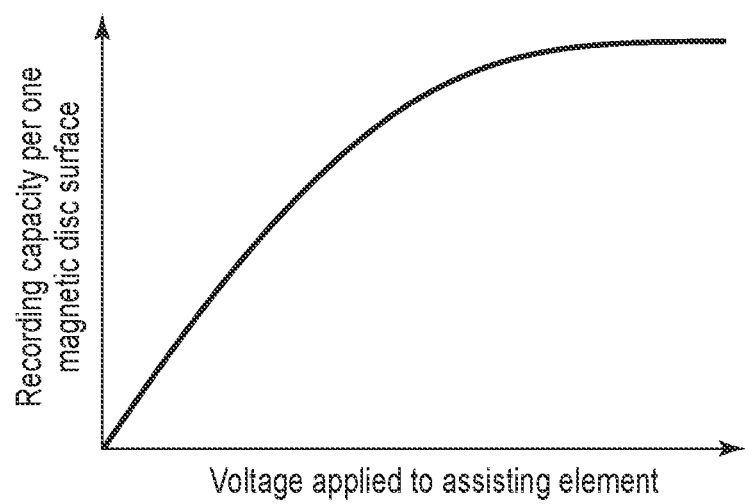
FIG. 10 is a graph illustrating a relationship between recording density and assisting energy.

FIG. 10 is a graphical representation of the relationship of recording density with respect to assist energy in the MAMR head.

As in the figure, for example, in the MAMR method, when the voltage to the STO increases, the magnetic field becomes stronger, and the magnetic recording density increases, but the recording density saturates at a certain point. This recording density can be interpreted as the recording capacity per magnetic disk surface.

The assisting amount used in the embedment is expressed differently depending on the assisted recording method, and in the MAMR method, the assisting amount may correspond to the element voltage applied to the STO. Even in the ePMR method which is assisted by magnetic field switching with an electric current, and the HAMR method, the relationship between the assisting amount with respect to the electric current or a laser diode power is similar.

Figure 11:
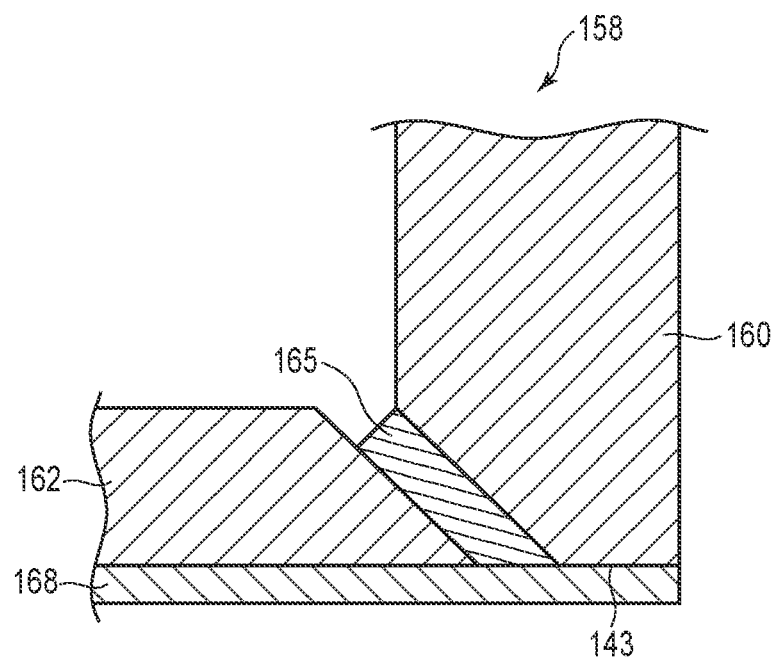
FIG. 11 is a cross-sectional view illustrating an example of the structure of an assisted recording method magnetic head.

FIG. 11 is a cross-sectional view of an example of the structure of a magnetic head using the energy assisted recording method.

For example, in the energy assisted recording method, as in the figure, the recording head 158 includes a main magnetic pole 160 formed of a highly saturated magnetization material that generates a recording magnetic field perpendicular to the surface of the magnetic disk, auxiliary pole 162 arranged in the trailing side of the main magnetic pole 160 and formed of a soft magnetic material, and conductive layer 165 arranged between the tip end in the ABS 143 side of the main magnetic pole 160 and the auxiliary pole 162 and flush with the ABS 143. The recording head 158 has a similar structure as in FIG. 7 except for using the conductive layer 165 instead of the magnetic flux control layer 65 of FIG. 7. When energizing the main magnetic pole 160, current is concentrated in the conductive layer 165, generating a magnetic field to assist the magnetic recording. In that case, since the strength of the magnetic field is proportional to the amount of current, in the energy assisted perpendicular magnetic recording method, the assisting amount can be almost equivalent to the amount of current.

Figure 12:
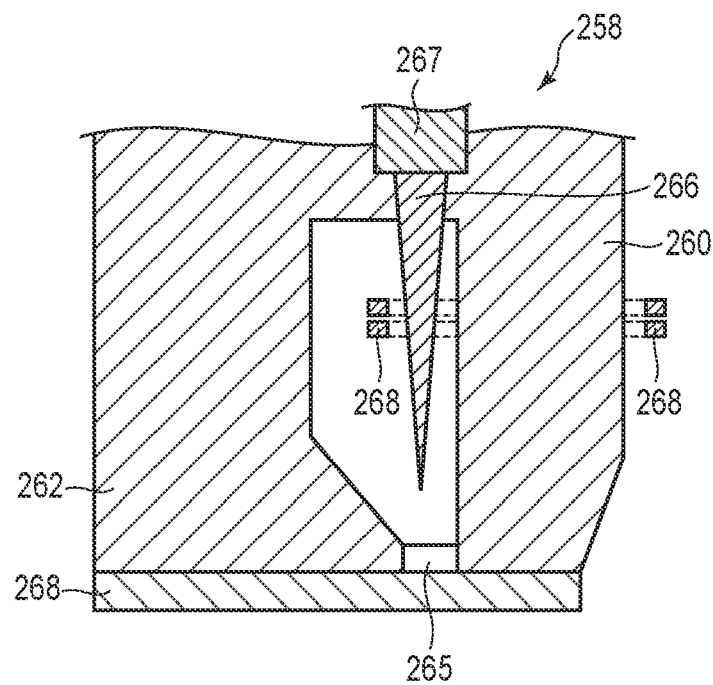
FIG. 12 is a cross-sectional view illustrating another example of the structure of the assisted recording method magnetic head.

Furthermore, FIG. 12 is a cross-sectional view of an example of the structure of a HAMR magnetic head.

As in the figure, the HAMR magnetic head 258 includes a near-field optical element disposed between a main magnetic pole 260 with a coil and an auxiliary pole 262, optical waveguide 266 that propagates light to the near-field optical element 265, and laser diode 267 as a light source supplying the light of the optical waveguide 266, and assists switching by heat generated by the evanescent light generated from the near-field optical element 265. In this case, since the power from the laser diode 267 is proportional to the assisting amount, and in the HAMR method, the assisting amount can be equivalent to the laser diode power.

For high recording density, maximizing the assisting amount may be considered in the assisted recording, however, increasing the assisting amount may cause electromigration due to heat generation and over-current, which deteriorates the head lifetime.

Figure 13:
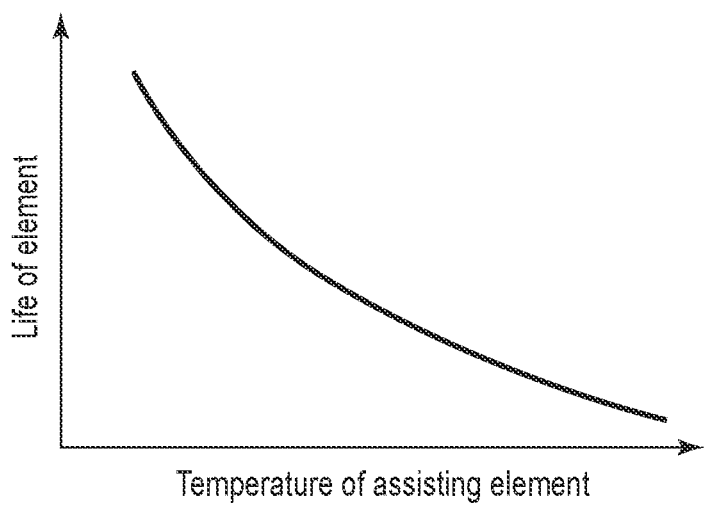
FIG. 13 is a graph illustrating a relationship between a lifetime of elements and assisting element temperature.

FIG. 13 is a graphical representation of the relationship of element lifetime with respect to the assisting element temperature in the MAMR head.

Here, element lifetime refers to the total write time before the bit error rate in a magnetic recording/reproducing device becomes worse than the minimum acceptable limit.

In the magnetic recording/reproducing device with assisted recording heads, the assisting amount of each magnetic head is determined in terms of both recording density and guaranteed operating time.

Figure 14:
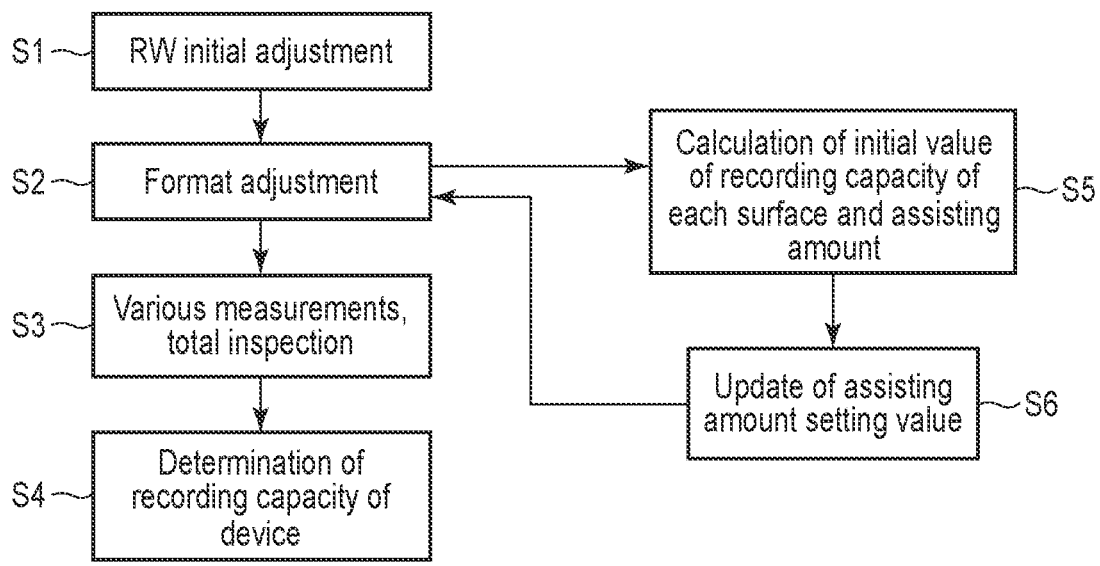
FIG. 14 is a flowchart illustrating operations of a system to adjust the recording capacity.

FIG. 14 is a part of the manufacturing system of the magnetic recording/reproducing device of the embodiment, and is a flowchart of the operations of the system adjusting the recording capacity for the assembled magnetic recording/reproducing device.

Usually, in the adjustment of the recording capacity on each surface of a magnetic disk, initially, with respect to the read/write capacity of the assembled magnetic recording/reproducing device, the initial adjustment of read/write conditions with the magnetic head corresponding to each recording surface of the magnetic recording medium is performed (S1). Next, format adjustment is performed for each recording surface (S2). Then, various measurements and overall inspections, such as defect inspections, are performed (S3). Then, the recording capacity as a magnetic recording/reproducing device is determined by summing the recording capacity of each magnetic disk surface (S4). Note that, the assembled magnetic recording/reproducing device here includes, for example, the magnetic recording/reproducing device in the state before the lid is attached.

If there is a difference in recording capacity of each recording surface, the access frequency for writing will differ, resulting in a difference in magnetic head lifetime on each recording surface. For example, if a recording surface with a recording capacity of 1 TB and a recording surface with a recording capacity of 800 GB coexist in a single magnetic recording/reproducing device, the total write time for the 1 TB surface is approximately 1.25 times higher than the 800 GB surface. Therefore, the head degradation is likely to proceed in the high-capacity surface.

Therefore, according to the embodiment, the assisting amount is lowered below the set value in the high recording capacity surface, and conversely, the assisting amount is raised in the low recording capacity surface, thus the adjustment to even the head lifetime for the expected write hours. This allows balanced use of each magnetic head without degradation and prevents deterioration of device lifetime.

The setting of the assisting amount for adjusting the assisting amount may be set as a part of the adjustment of the recording capacity of the magnetic recording/reproducing device of FIG. 14. For the setting of the assisting amount, the assisting amount adjustment part 130 provided with the magnetic recording/reproducing device of the embodiment can be used.

The recording capacity calculation unit 121 of the assisting amount adjustment part 130 calculates the initial value of the recording capacity of each recording surface from a certain assisting amount, acquires the ratio of the recording capacity of each recording surface, calculates the assisting amount of each magnetic head based on the ratio of each recording capacity, and performs the adjustment of the assisting amount. The initial value of the recording capacity of each recording surface can be stored in the initial value storage unit 128. The adjustment of the assisting amount may include, in the write time calculation unit 22, calculating a write time ratio from the ratio of the recording capacity and backward calculating the assisting amount in proportion to the write time ratio in the assisting amount determination unit 124 (S5). The determination unit 124 determines the assisting amount corresponding to the write time ratio. The instruction section 127 instructs updating the assisting amount setting value based on the determined assisting amount (S6). The update value of the assisting amount can be stored in the update value storage unit 129.

In the update of the assisting amount setting value, a formula or table of temperature and element lifetime for resistance value can be prepared in advance for the magnetic head. For example, if the device lifetime follows the general Arrhenius model, the device lifetime can be calculated by the following formula (1).

$$L = A \times \exp(\Delta Ea/kT) \quad (1)$$

where L is the device lifetime, A is a coefficient specific to the device or other equipment, $\Delta Ea$ is the activation energy of device degradation, k is Boltzmann's constant, and T is the device temperature.

The following formula (2) can also be used for the case where the device lifetime follows a power-law model.

$$L = B \times S^n \quad (2)$$

where B is a device or other specific coefficient, S is voltage or laser diode power, and n is a device specific coefficient.

Using these formulae, the available assisting amount can be backward-calculated from the write time ratio for each surface.

Note that, this update process may be completed once, or it may be performed multiple times to increase accuracy. In this adjustment, the assisting amount is larger than the initial adjustment value for low recording capacity recording surfaces and smaller than the initial adjustment value for high recording capacity recording surfaces, and thus, the adjustment is negatively correlated with the recording capacity.

By using the magnetic recording/reproducing device of the embodiment, assisted recording is used as the magnetic recording method, and an assisting amount adjustment part is connected to the assisted magnetic recording head, and thereby, individual assisting amount of the magnetic head can be adjusted. Even if there is a difference in the load of each magnetic head due to the difference in the recording capacity of each recording surface, the recording surface with a high recording capacity requires less assisting amount, and the recording surface with a low recording capacity requires more assisting amount, and the difference can be mitigated. In this way, the load on the recording head is distributed as evenly as possible on each recording surface, the lifetime of each magnetic head is adjusted more evenly, and each magnetic head is used in a balanced manner with as little degradation as possible, thereby reducing the lifetime of the magnetic recording/reproducing device itself can be prevented from deteriorating.

According to the magnetic recording/reproducing method of the embodiment, assisted magnetic recording is used as the magnetic recording method, and the assisting amount of each individual magnetic recording head can be changed. The ratio of the recording capacity of each recording surface can be acquired, and the assisting amount of each assisted magnetic recording head can be adjusted based on the ratio of the recording capacity. In the adjustment of the assisting amount, the assisting amount is reduced for a recording surface with a high recording capacity and is increased for a recording surface with a low recording capacity, and thus, the load on each magnetic head can be equalized as much as possible. This has the effect of adjusting the lifetime of each magnetic head and using each magnetic head in a balanced manner with as little degradation as possible, thereby preventing the deterioration of the lifetime of the magnetic recording/reproducing device.

Using the following examples, the embodiment will be explained specifically.

EXAMPLES

Example 1

The MAMR magnetic recording head was created as follows.

First, on the main magnetic pole, which is mainly composed of FeCo, layers of the following materials and thicknesses, respectively, were placed using the DC magnetron sputtering method, from the first conductive layer, adjustment layer, and second conductive layer in this order. Thereby, the magnetic flux control layer 1, which has the same configuration as the magnetic flux control layer 65 of FIG. 7 was obtained. The first conductive layer, adjustment layer, and second conductive layer were structured the same as the intermediate layer 65a, adjustment layer 65b, and conduction cap layer 65c of FIG. 7, respectively.

The first conductive layer is, for example, a metal layer of Cu, Au, Ag, Al, Ir, NiAl alloy, etc., and is formed of a material that does not interfere with spin conduction. The adjustment layer can be formed of a magnetic material containing at least one of iron, cobalt, or nickel. The magnetic material can be, for example, an alloy material of FeCo with an additive of at least one of Al, Ge, Si, Ga, B, C, Se, Sn, and Ni, or, at least one type of material selected from an artificial lattice group consisting of Fe/Co, Fe/Ni, and Co/Ni.

A mask layer was formed to define the size of the stripe height direction on the magnetic flux control layer 1, and then, the magnetic flux control layer was etched by ion beam etching (IBE) until the main magnetic poles are exposed. An insulating film SiOx (where x is an oxidization number) was deposited on the area around the magnetic flux control layer, and then the mask layer was removed. A mask layer to define the size in the track width direction was also created and etched in the same manner, and an insulating film SiOx was deposited on the peripheral portions of the element to process the magnetic flux control layer 1.

Next, NiFe was formed as a trailing shield on the conduction cap layer.

Then, a Si base layer of 1 nm was sputtered onto the main magnetic pole in the ABS side, flux control layer, trailing shield, and insulating film. Then, on the Si base layer, a diamond-like carbon film was deposited by CVD method to obtain a protection layer having a thickness of 1.6 nm to achieve a magnetic recording head. In the same way, a magnetic recording head to be incorporated into HDD with 18 heads and 9 magnetic disks, and 200 magnetic recording/reproducing devices in total were prepared.

100 of the 200 magnetic recording/reproducing devices obtained were categorized as comparative examples, and subjected to the initial adjustment of read/write conditions with the corresponding magnetic head for each recording surface of the magnetic recording media, format adjustment of each recording surface, various measurements, and full surface inspection for defects, for example. Then, the recording capacity as a magnetic recording/reproducing device was determined by summing the recording capacity of each magnetic disk surface. On the other hand, the remaining 100 devices were categorized as examples, and subjected to the same except for acquiring the ratio of recording capacity during the format adjustment of each recording surface, and calculating a setting value of the assisting amount of each magnetic head based on the ratio of each recording capacity.

As a long-time current-carrying test, the obtained HDDs were set in an ambient temperature of 70° C., and the magnetic flux control layer was kept energized with a 300 mV applied voltage for 5000 hours. At this time, for Comparative Example 1, no adjustment of the assisting amount was made, and for Example 1, the amount of current to the flux control layer was adjusted as the assisting amount based on the setting value of the assisting amount. The bit error rate (BER) was measured before and after energizing.

As a result, with respect to the BER value before the energizing test, there were multiple heads with increased BER at the time of 5000 hours. The following results were obtained when the number of pieces was counted by judging OK/NG at the cutoff value of $1 \times 10^{-1.7}$.

Energization test results
Number of BER NG units
Example 1: 5/100
Comparative Example 1: 15/100

The devices were disassembled and analyzed to find that many BER NGs occurred in the elements with high load (long write time) on the assist elements. The results of this study showed that, compared to Comparative Example 1, Example 1 was able to prevent the deterioration of the lifetime of the assisted recording head on average, and to suppress the degradation of the recording head within a certain time period.

Example 2

HAMR magnetic recording heads were prepared by the following method.

First, the optical waveguide for near-field light on the main magnetic pole, which is mainly composed of FeCo, was prepared with $Al_2O_3$ or $Ta_2O_5$ with a high refractive index. The optical waveguide was connected to a laser diode in the light source unit. On the opposite side of the main magnetic pole, a near-field optical elements were prepared using, for example, Au, Pd, Pt, Rh, or an alloy containing two or more of these elements.

Furthermore, a heat sink layer formed of Cu was created near the main magnetic pole to create a thermal assisted magneticrecording head. A material with high magnetic anisotropy (Hk), mainly composed of FePt, was used for the magnetic recording layer of the magnetic recording medium used. Fifty of such heads were prepared, 25 of which were used in Example 2 and the remaining 25 in Comparative Example 2 to assemble magnetic recording/reproducing devices.

The obtained magnetic recording/reproducing devices were subjected to a long time energizing test as in Example 1 except that the evaluation environment temperature was set to room temperature, and the near-field optical element was energized for 2000 hours. As to Comparative Example 2, the assisting count was not adjusted, and the laser diode power was adjusted as the assisting amount based on the setting value of the assisting amount for Example 2. The bit error rate (BER) was measured before and after energizing.

As a result, with respect to the BER value before the energizing test, there were multiple heads with increased BER at the time of 2000 hours. The following results were obtained when the number of pieces was counted by judging OK/NG at the cutoff value of $1\times10^{-1.7}$.

Energization test results
Number of BER NG units
Example 2: 7/25
Comparative Example 2: 10/25

Furthermore, the devices were disassembled and analyzed to find that many BER NGs occurred in the elements with high load (long write time) on the assist elements. The results of this study showed that, compared to Comparative Example 2, Example 2 was able to prevent the deterioration of the lifetime of the assisted recording head on average, and to suppress the degradation of the recording head within a certain time period.

Example 3

Magnetic heads of the energy assisted recording method were prepared in the same manner as in Example 1.

In this Example, instead of the magnetic flux control layer 65, Cu as a non-magnetic conductive band is embedded as the conductive layer 165. Other than that, the structure was the same as that of Example 1.

In this state, the magnetization switching of the head is assisted by the generation of a magnetic field due to the electric current, instead of the reversal and rotation of the magnetization of the flux control layer. 200 of such heads were prepared, with 100 as Example 3 and the remaining 100 as Comparative Example 3.

The obtained devices were subjected to a long time energizing test as in Example 1 except that the evaluation environment temperature was set to room temperature, and evaluation time was set for 5000 hours.

As a result, with respect to the BER value before the energizing test, there were multiple heads with increased BER at the time of 5000 hours. The following results were obtained when the number of pieces was counted by judging OK/NG at the cutoff value of $1\times10^{-1.7}$.

Energization test results
Number of BER NG units
Example 3: 23/100
Comparative Example 3: 40/100

Furthermore, the devices were disassembled and analyzed to find that many BER NGs occurred in the elements with high load (long write time) on the assist elements. The results of this study showed that, compared to Comparative Example 3, Example 3 was able to prevent the deterioration of the lifetime of the assisted recording head on average, and to suppress the degradation of the recording head within a certain time period.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic recording/reproducing device comprising:
   a plurality of magnetic recording medium each including a recording surface;
   a plurality of assisted magnetic recording heads each provided with the recording surface in order to perform assisted recording; and
   an assisting amount adjustment part connected to the assisted magnetic recording heads in order to adjust an assisting amount of each assisted magnetic recording head corresponding to a recording capacity of the recording surface,
   wherein the recording capacity has a negative correlation relationship with respect to the assisting amount.

2. The magnetic recording/reproducing device of claim 1, wherein the assisted recording is one of microwave assisted magnetic recording, thermal assisted magnetic recording, or energy assisted perpendicular magnetic recording.

3. A magnetic recording/reproducing method using an assisted magnetic recording/reproducing device with a plurality of magnetic recording medium each including a recording surface and a plurality of assisted magnetic recording heads each provided with the recording surface in order to perform assisted recording, the method comprising:
   calculating an initial value of recording capacity of each recording surface from a constant assisting amount;
   acquiring a ratio of the initial value with respect to a sum of the initial values as a ratio of the recording capacity of each recording surface; and
   performing adjustment of an assisting amount of the magnetic head based on the ratio of each recording capacity.

4. The magnetic recording/reproducing method of claim 3, wherein the adjustment of the assisting amount includes backward calculation of a write time ratio, which is a ratio of adjusted write time with respect to total write time corresponding to the recording capacity, from the ratio of the recording capacity, and adjusting the assisting amount in proportion to the write time ratio.

5. The magnetic recording/reproducing method of claim 3, wherein the assisted recording is microwave assisted magnetic recording, thermal assisted magnetic recording, or energy assisted perpendicular magnetic recording.

* * * * *